United States Patent [19]

Albert et al.

[11] Patent Number: 4,980,607
[45] Date of Patent: Dec. 25, 1990

[54] LIGHT BULB LIFE EXTENDER

[75] Inventors: Donald Albert, Higganum; Anthony M. Tremaglio, Waterbury, both of Conn.

[73] Assignee: Miracle Products, Inc., Watertown, Conn.

[21] Appl. No.: 207,858

[22] Filed: Jun. 17, 1988

[51] Int. Cl.[5] .................. H01J 7/44; H05B 37/00; H02M 1/00
[52] U.S. Cl. ................... 315/71; 315/200 R; 363/146
[58] Field of Search ............. 315/200 R, 240, 71; 363/146

[56] References Cited
U.S. PATENT DOCUMENTS 3,446,991  3/1966  Howell ............... 315/200 R
4,229,680 10/1980  Berlin, Jr. et al. ........ 315/71
4,547,704 10/1985  Brinn et al. ............. 315/71
4,888,678 12/1989  Sundhar ................ 315/71

*Primary Examiner*—Eugene R. LaRoche
*Assistant Examiner*—Michael B. Shingleton
*Attorney, Agent, or Firm*—Sherman and Shalloway

[57] ABSTRACT

Disclosed herein is an improved light bulb life extender device made in a small disc-like form and designed to be removably insertable into an Edison-type light bulb socket. The inventive device is operative to place in series with a source of electrical power a silicon bilateral voltage triggered switch specifically designed to allow a voltage output of a predetermined percentage of the voltage inputted thereto. Through this reduction in voltage, the associated light bulb will burn slightly less brightly but with significantly extended life span.

5 Claims, 2 Drawing Sheets

LIGHT BULB LIFE EXTENDER

BACKGROUND OF THE INVENTION

This invention relates to devices used to provide a dimming function for ordinary single filament incandescent light bulbs. It is specifically designed to fit into a screw-in light bulb socket such as an Edison-type socket, although, with appropriate modifications, the device may also be utilized in other light bulb sockets of different types.

Screw-in sockets have been in common use for many years and devices designed to control current and/or voltage for dimming light bulbs are also known U.S. Pat. Nos. 3,450,893, 3,818,263 and 3,823,339 each disclose a device which utilizes a diode rectifier sandwiched between a pair of metal disc contacts. In each case, the contacts and rectifier are surrounded by a ring of insulating material which separates the contacts from each other and the socket's outer conductor. The assembly disclosed in these patents is placed in a lamp socket between the center conductor of a light bulb and the bottom conductor of the socket and operates by cutting off the top halves of the AC line current waveform to simultaneously dim the associated bulb, reduce temperature and extend the lifetime of the bulb.

U.S. Pat. No. 4,438,344 to applicants herein discloses a dimming disc for removable installation into an Edison-type socket which includes a switching device allowing the associated rectifier to be either switched into or out of the circuit depending upon how far the light bulb is threaded into the socket. Besides the patents discussed above, the following patents were cited during the prosecution of U.S. Pat. Nos. 4,438,344: 2,158,851 to Ceader, 2,158,862 to Phelps, 2,170,317 to Bussmann, 2,688,669 to Quill, 2,824,183 to Marusco, et al., 3,215,891 to Fritz, et al., 3,818,153 to Arvai and 4,229,680 to Berlin, Jr., et al. These references are believed to be of only general interest to the teachings of the present invention.

The main problem with known light bulb dimming devices is that they operate on the principle of the rectifier which eliminates half of each full wave in alternating current. Thus, these devices dim the associated light bulb by approximately 50 percent. In many applications, such dimming is too great and results in insufficient light being present with the dimming device installed Thus, a need has developed for a light bulb dimming device which is portable in nature, easily installed in an existing Edison-type socket but which dims a light bulb less than 50 percent. It is with these aspects in mind that the present invention was developed.

The present invention relates to an improved light bulb dimming device. A need has developed for a light bulb dimming device which is portable, able to be removably installed within a light socket and which reduces the voltage supplied to the light bulb less than 50 percent. The present invention fulfills these objectives.

The present invention includes the following interrelated aspects and features:

(a) In a first aspect of the present invention, the inventive device includes a housing having insulated periphery and top and bottom portions (b) Each of the top and bottom portions includes a central opening the rethrough exposing contact structure within the housing The top portion opening exposes an electrically conductive contact and the bottom portion opening exposes another electrically conductive contact, which contacts are separated by an insulated space r of annular form defining, along with said contacts, a central chamber.

(c) Within the central chamber is located a silicon bilateral voltage triggered switch having a thickness slightly less than the distance between the electrically conductive contacts. In the preferred embodiment, the switch rests upon the lower contact and has an upper surface slightly spaced from the upper contact.

(d) The upper and lower electrically conductive contacts are specifically designed to be flexible so that when a light bulb is screwed into the associated socket, these contacts may flex sufficiently to enable the upper and lower conductive surfaces of the switch to be serially included in an electrical circuit including a source of alternating current power (e) The silicon bilateral voltage triggered switch is specifically designed to allow a lesser amount of voltage out than is inputted therein. In the preferred embodiment of the present invention, the voltage which the switch allows to be applied against the light bulb is reduced to 85 percent of the input line voltage.

(f) Mounted on top of the top portion of the housing is an annulus made of a resilient foam material and preferably having an adhesive on its upper and lower surfaces so that it may adhere both to the top portion of the housing and to the undersurface of the associated light bulb in surrounding relation to the central terminal thereof to facilitate installation.

Accordingly, it is a first object of the present invention to provide an improved light bulb life extender device It is a further object of the present invention to provide such an improved light bulb life extender device including circuitry designed to reduce the voltage applied to the associated light bulb by less than 50 percent.

It is a still further object of the present invention to provide an improved such device of dimensions small enough to facilitate the easy mounting of the device within a typical light bulb socket.

These and other objects, aspects and features of the present invention will be better understood from the following detailed description of the preferred embodiments when read in conjunction with the appended drawing figures.

SPECIFIC DESCRIPTION OF THE PREFERRED EMBODIMENT

Figure 1:
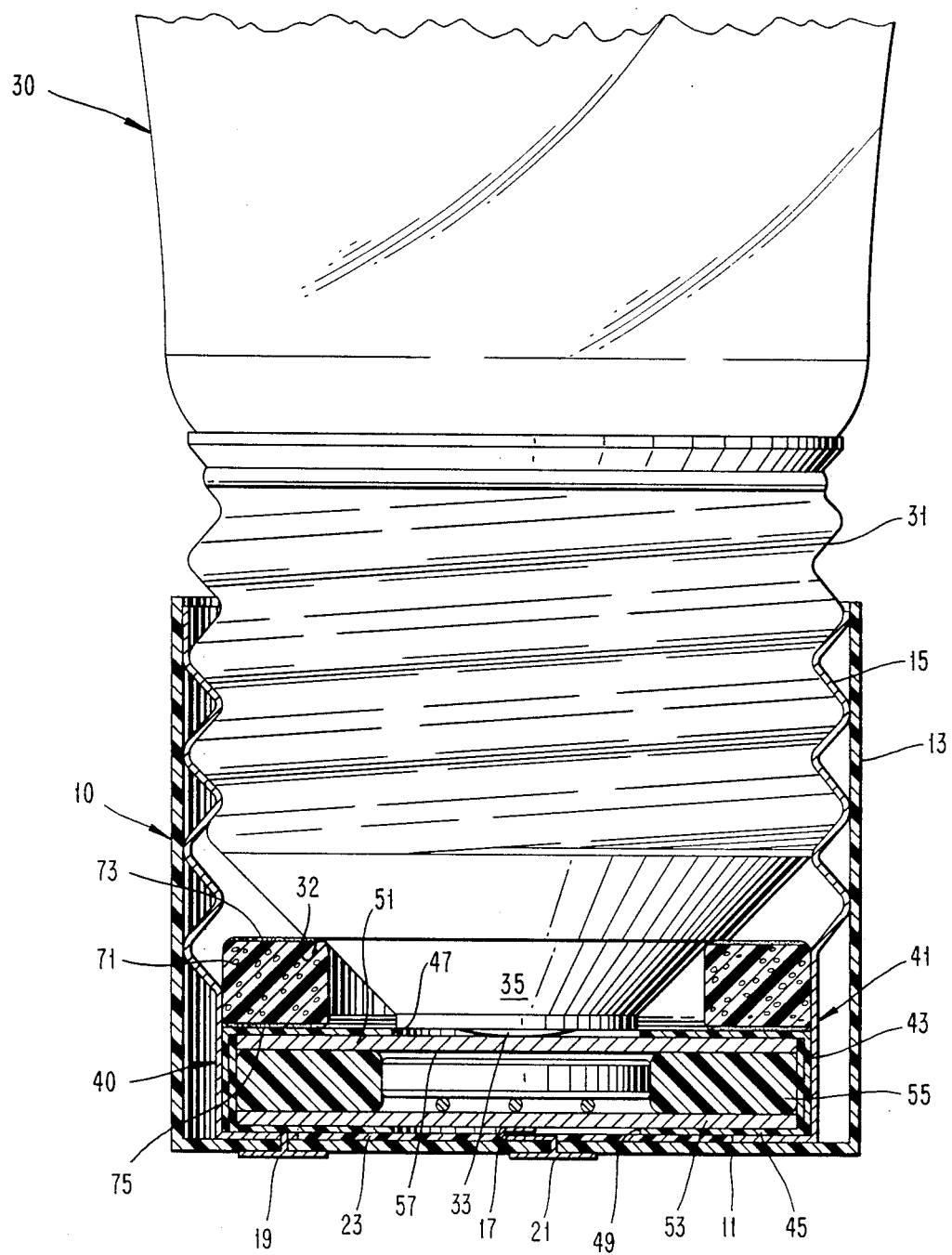
FIG. 1 shows a cross-sectional view of the present invention as mounted in a light bulb socket.

With reference, first, to FIG. 1, it is seen that a light socket 10 includes a bottom surface 11, an annular substantially cylindrical wall 13, an outer terminal 15 at least partially threaded to accommodate the threaded exterior of a light bulb, and a central terminal 17 designed to electrically connect with the central terminal at the end of a light bulb.

As seen in FIG. 1, the terminal 15 has a contact 19 electrically connected thereto while the terminal 17 has a similar contact 21 connected thereto. An insulator 23 electrically separates the contacts 19 and 21.

With further reference to FIG. 1, it is seen that a light bulb 30 includes an outer wall 31 forming a first terminal designed to electrically connect to the terminal 15 when the light bulb 30 is threaded into the socket 10, and a second terminal 33 designed to electrically connect with the central terminal 17 of the socket 10. An insulator 35 separates the terminals 31 and 33.

Figure 2:
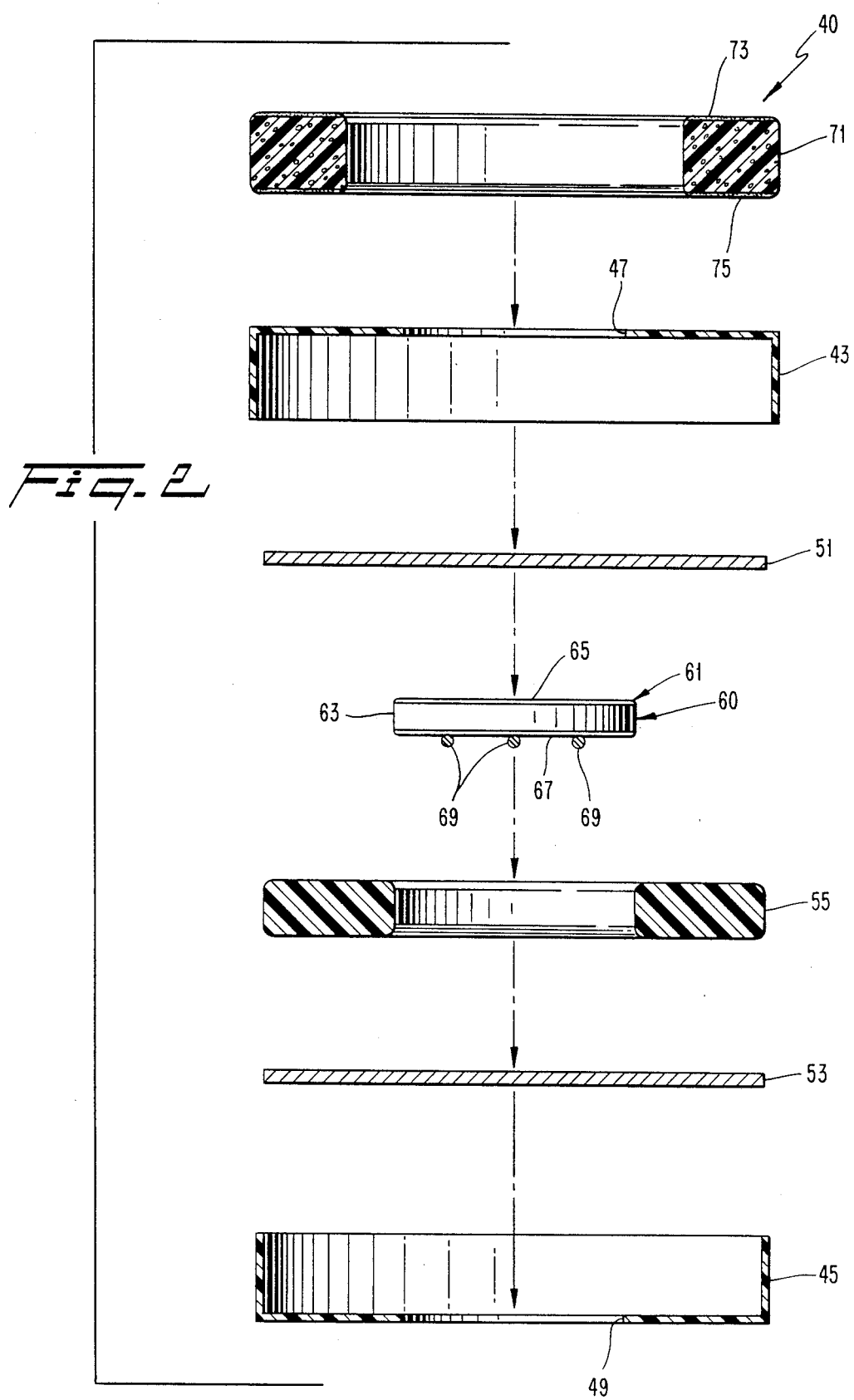
FIG. 2 shows an exploded cross-sectional view of the invention shown in FIG. 1.

With reference now to FIGS. 1 and 2, it is seen that the inventive light bulb extending device 40 includes a housing 41 made up of an upper outer insulated shell 43 and a lower inner insulated shell 45 which are assembled together in the manner shown in FIG. 1. As shown in the figures, the upper shell 43 includes a central opening 47 whereas the lower shell 45 includes a central opening 49. As seen in FIG. 1, the opening 47 is provided to allow the terminal 33 of the light bulb 30 to extend therethrough whereas the opening 49 is provided so as to allow the terminal 17 of the socket 10 to extend the rethrough.

Mounted within the housing 41 are spaced electrically conductive contacts 51 and 53 which are separated from one another within the housing by an annular insulated spacer 55. As seen in FIG. 1, the spacer 55 includes a central opening defining with the contacts 51, 53 a chamber 57. The contacts 51 and 53 are made sufficiently thin enough so that when the light bulb 30 is screwed into the socket 10 pressure imposed on the device 40 by the terminal 33 of the light bulb 30 will cause flexing of the contact 51 in the direction of the contact 53.

Mounted within the chamber 57 is a control circuit 60 including a housing 61 with an annular wall 63 made of an insulative material, an upper electrically conductive wall 65, a lower electrically conductive wall 67 and a plurality of electrically conductive spacer members 69 attached to the lower wall 67. The spacer members 69 are provided to give the device 60 sufficient thickness so that slight flexing of the contact 51 will allow its engagement with the surface 65.

The control circuit 60, in the preferred embodiment of the present invention, comprises a silicon bilateral voltage triggered switch. In the operation of this device, upon application of a voltage exceeding the breakover voltage point, the device switches on through a negative resistance region to a low on-state voltage. Conduction through the device will continue until the current is interrupted or drops below the designated holding current of the de vice. Such a device is manufactured by Teccor Electronics, Inc. of Irving, Tex. under the brand name "SIDAC". Several examples of these devices are manufactured and distributed by Teccor Electronics, Inc. One example of such device reduces the output voltage to 85 percent of the input voltage while another example reduces the output voltage to 76 percent of the input voltage. The use of either of these devices in the present invention is a significant improvement over the prior art rectifier-based devices which reduce the output voltage to 50 percent of the input voltage. Through the use of the present invention including the use of a silicon bilateral voltage triggered switch, extension of bulb life still accrues, however, the lumen output of the bulb is significantly greater than would be the case when a rectifier is utilized in such a device. It is expected that the use of a silicon bilateral voltage triggered switch which reduces the output voltage to approximately 85 percent of the input voltage will extend the life of a light bulb from one to four years. Furthermore, the use of such a device which reduces the output voltage to 76 percent of the input voltage is expected to increase the lifetime of a light bulb to over five years The present invention including the use of a silicon bilateral voltage triggered switch is expected to provide energy savings as well as safer operation It has been found that when rectifier-based such devices are utilized, which reduce the output voltage by 50 percent, there is a temptation to increase the rating of the light bulb which is connected to the socket to somewhat compensate for the great reduction in lumen output. Through the use of the present invention which may only reduce the output by 15 percent, there is less of a likelihood that higher rated bulbs will be utilized thus increasing safety.

With reference back to the figures, it is seen that an annular foam doughnut 71 is provided including an upper surface 73 coated with adhesive and with a lower surface 75 similarly coated with adhesive. This doughnut 71 is provided, as best seen in FIG. 1, to rest between the lower surface 32 of the bulb 30 and the shell 43 while allowing the contact 33 to enter the opening 47 and engage the contact 51. The doughnut 71 is provided with the adhesive surfaces so that it may be easily adhered to the surface 32 of the bulb 30 to facilitate easy installation of the device in the socket 10. Furthermore, the resilient nature of the doughnut 71 allows a combination for light bulbs 30 of slightly differing configurations As such, an invention has been disclosed in terms of a preferred embodiment thereof which fulfills each and every one of the objects as set forth hereinabove and provides a new and improved light bulb life extending device which extends the life of the light bulb while providing increased lumen output thereof as compared to prior art devices.

Of course, various changes, alterations and modifications in the teachings of the pre sent invention may be contemplated by those skilled in the art without departing from the intended spirit and scope thereof. Accordingly, it is intended that the present invention only be limited by the terms of the appended claims.

We claim:

1. An improved light bulb life extender comprising:
    (a) an insulative housing of disc-like configuration having a top surface with a first central opening and a bottom surface with a second central opening;
    (b) said housing defining a chamber therein containing first and second contact discs separated by an annular insulated spacer de fining a sub-chamber;
    (c) a bilateral voltage triggered switch having a thickness slight less than the separation of said discs and having an upper control surface facing said first contact disc and a lower contact surface facing said second contact disc;
    (d) at least one of said contact discs being deformable by pressure applied thereon to warp it into contact with said switch to cause an electrical circuit to be completed from said first contact disc through said switch to said second contact disc, said switch allowing an output voltage of more than 50% of the input voltage inputted thereon.

2. The invention of claim 1, wherein said output voltage is about 85% of said input voltage.

3. The invention of claim 1, wherein said output voltage is about 76% of said input voltage 4. The invention of claim 1, further including a foam doughnut mounted on said top surface by adhesive means having an opening sized to allow a terminal of a light bulb to pass therethrough.

5. The invention of claim 1, wherein said lower contact surface of said switch has mounted thereon at least one conductive spacer.

* * * * *